(12) United States Patent
Uwabo et al.

(10) Patent No.: US 6,538,848 B1
(45) Date of Patent: Mar. 25, 2003

(54) MAGNETIC DISK

(75) Inventors: Tsuneo Uwabo, Kanagawa (JP);
Yoshihiro Okano, Kanagawa (JP);
Eiichi Yoneyama, Kanagawa (JP);
Yoshinori Tangi, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/492,073

(22) Filed: Jan. 27, 2000

(30) Foreign Application Priority Data

Jan. 29, 1999 (JP) .......................................... 11-022954

(51) Int. Cl.[7] ............................................ G11B 23/033
(52) U.S. Cl. ...................................................... 360/133
(58) Field of Search ................................. 360/133, 135; 369/289, 291

(56) References Cited

U.S. PATENT DOCUMENTS

| | | | | |
|---|---|---|---|---|
| 3,774,757 A | * | 11/1973 | Harris et al. ................. | 206/313 |
| 4,194,464 A | * | 3/1980 | Dye et al. .................... | 118/501 |
| 4,251,843 A | * | 2/1981 | Matsuyama et al. ........ | 360/137 |
| 4,510,546 A | * | 4/1985 | Asami et al. ................ | 360/133 |
| 4,544,977 A | * | 10/1985 | Ozawa et al. ............... | 360/133 |
| 4,695,912 A | * | 9/1987 | Morikawa .................... | 360/133 |
| 5,537,389 A | * | 7/1996 | Kuwa et al. ................. | 369/291 |
| 5,793,584 A | * | 8/1998 | Knight et al. ................ | 15/1.51 |
| 6,021,027 A | * | 2/2000 | Kikuchi ....................... | 360/133 |
| 6,198,598 B1 | * | 3/2001 | Meguro ....................... | 360/133 |
| 6,274,227 B1 | * | 8/2001 | Oiri et al. .................... | 428/212 |

FOREIGN PATENT DOCUMENTS

| | | | |
|---|---|---|---|
| JP | 61-258380 | * | 11/1986 |
| JP | 62-112278 | * | 5/1987 |
| JP | 1-119975 | * | 5/1989 |
| JP | 4-325980 | * | 11/1992 |
| JP | 5-159511 | * | 6/1993 |
| JP | 8-31136 | * | 2/1996 |

* cited by examiner

Primary Examiner—David L. Ometz
(74) Attorney, Agent, or Firm—Whitham, Curtis & Christofferson, P.C.

(57) ABSTRACT

A magnetic disk 20 includes a disk-like magnetic data recording medium 4 in which data are allowed to be read and written; and a disk case 2 which rotatably incorporates the magnetic data recording medium 4, liners 9 are bonded to faces of the case 2 which are opposed to a magnetic data recording plane 5 of the magnetic data recording medium 4, respectively. The liners attract dust by means of an electrostatic attractive force while supporting front and back sides of the magnetic data recording plane 5.

5 Claims, 5 Drawing Sheets

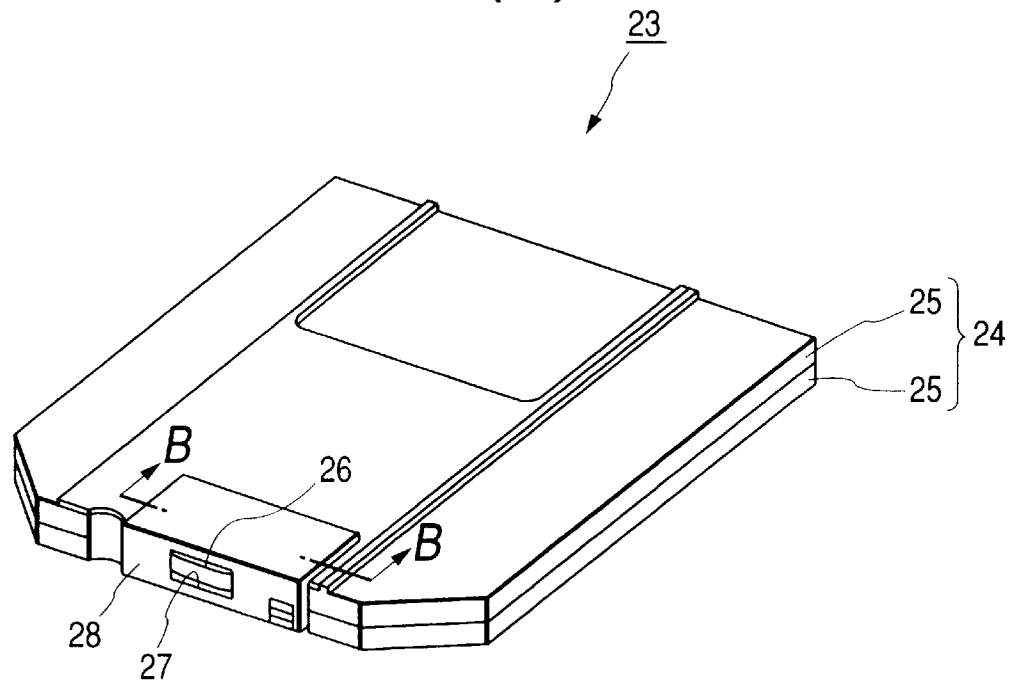
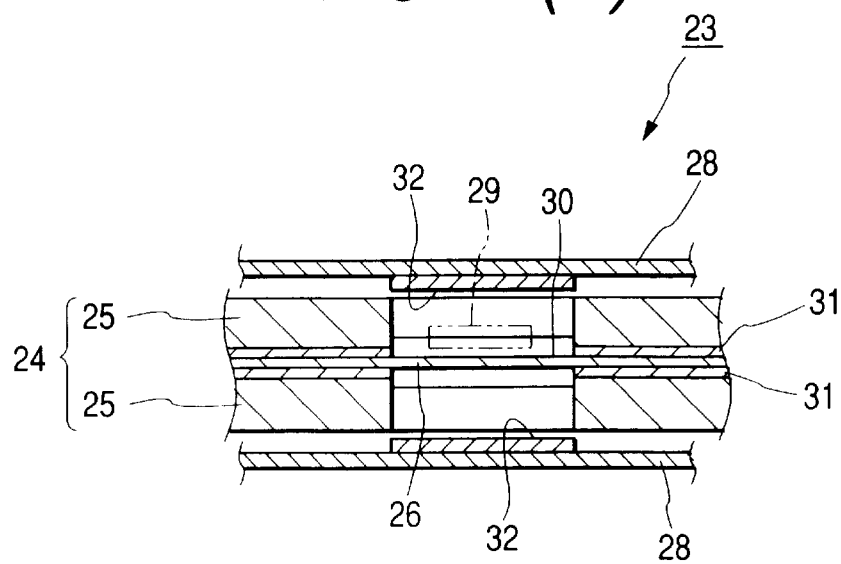

MAGNETIC DISK

BACKGROUND OF INVENTION

1. Field of the Invention

The present invention relates to a magnetic disk in which magnetic data are allowed to be read and written so as to reproduce and store the magnetic data, and more particularly to a magnetic disk which is configured so as to maintain cleanness of a recording plane of a disk-like magnetic data recording medium, thereby allowing data to be correctly read and written.

2. Related Art

FIG. 5 shows the structure of a prior art magnetic disk which is called a flexible disk or a floppy disk.

As shown in the figure, in the magnetic disk 1, a disk case 2 is configured by bonding a pair of upper and lower shells (or jackets) 3 to each other, and a disk-like magnetic data recording medium 4 in which data can be read and written is rotatably incorporated in the disk case 2. In the shells 3, rectangular windows 6 are formed by performing cutting in a radial direction so that a reading/writing head of a floppy disk drive (not shown) serving as a data reading/writing device is allowed to be externally contacted with a magnetic data recording plane 5 of the magnetic data recording medium 4 to read and/or write data. Disk-like liners 7 which are made of rayon or polyester are bonded to faces of the case 2 corresponding to the magnetic data recording plane 5 of the magnetic data recording medium 4, so as to be opposed to the magnetic data recording plane 5.

As shown in FIGS. 6(A) and 6(B), an infinite number of projections and depressions are formed in the surface of each of the liners 7, and the liners 7 support the front and back sides of the magnetic data recording medium 4 which is rotating, so that, while preventing the medium from being directly contacted with the inner faces 8 of the case 2, the liners clean the recording plane by wiping away dust deposited on the magnetic data recording plane 5, in positions upstream and downstream from the reading/writing head of the floppy disk drive in the rotation direction.

As shown in FIG. 5, a shutter 10 is slidably attached to the case 2 so as to open and close the windows 6. The shutter 10 is configured in the following manner. When the magnetic disk 1 is inserted into a magnetic disk slot (not shown) of the floppy disk drive, the shutter is engaged with an opening and closing device (not shown) which is incorporated in the vicinity of the slot, to perform an opening operation. At this time, the reading/writing head is contacted with the reading/writing surface of the magnetic disk 1 by a predetermined load pressure.

As described above, in the magnetic disk 1, dust on the magnetic data recording plane 5 is wiped away by contacting between the liners 7 and the magnetic data recording plane 5. However, the liners 7 have a low ability of attracting and holding dust, and, during a period when the rotation of the disk is stopped, cannot prevent dust from being deposited on the magnetic data recording plane 5.

SUMMARY OF INVENTION

Consequently, there arises a technical problem which is to be solved in order to efficiently attract dust deposited on a magnetic data recording plane of a magnetic data recording medium, and hold the attracted dust. It is an object of the invention to solve the technical problem.

The invention has been conducted in order to attain the object.

The invention provides a magnetic disk comprising:

a disk-like magnetic data recording medium in which data are allowed to be read and written; and electrostatic attracting means for attracting dust by means of an electrostatic attractive force, the electrostatic attracting means being made of an electrostatic material and opposed to a magnetic data recording plane of the magnetic data recording medium.

The invention provides also a magnetic disk wherein the magnetic disk further comprises:

a disk-like magnetic data recording medium in which data are allowed to be read and written; and a disk case which rotatably incorporates the disk-like magnetic data recording medium, and the electrostatic attracting means is configured by liners which are made of an electrostatic material, and which are interposed between inner faces of the case and the magnetic data recording plane of the magnetic data recording medium to support front and back sides of the magnetic data recording medium, the liners attracting dust by means of an electrostatic attractive force.

The invention provides also a magnetic disk wherein the magnetic disk further comprises:

a disk-like magnetic data recording medium in which data are allowed to be read and written;

a disk case which rotatably incorporates the disk-like magnetic data recording medium; and liners which are interposed between inner faces of the case and the magnetic data recording plane of the magnetic data recording medium to support front and back sides of the magnetic data recording medium, and the electrostatic attracting means is configured by subliners which are made of an electrostatic material, and which are interposed between the liners and the magnetic data recording plane of the magnetic data recording medium, the subliners attracting dust by means of an electrostatic attractive force.

BRIEF DESCRIPTION OF THE DRAWINGS

FIG. 4 shows a still other embodiment of the magnetic disk of the invention, in which FIG. 4(A) is a perspective view of the disk, and FIG. 4(B) is a section view taken along the line B—B of FIG. 4(A).

DETAILED DESCRIPTION OF PREFERRED EMBODIMENTS

Figure 1:
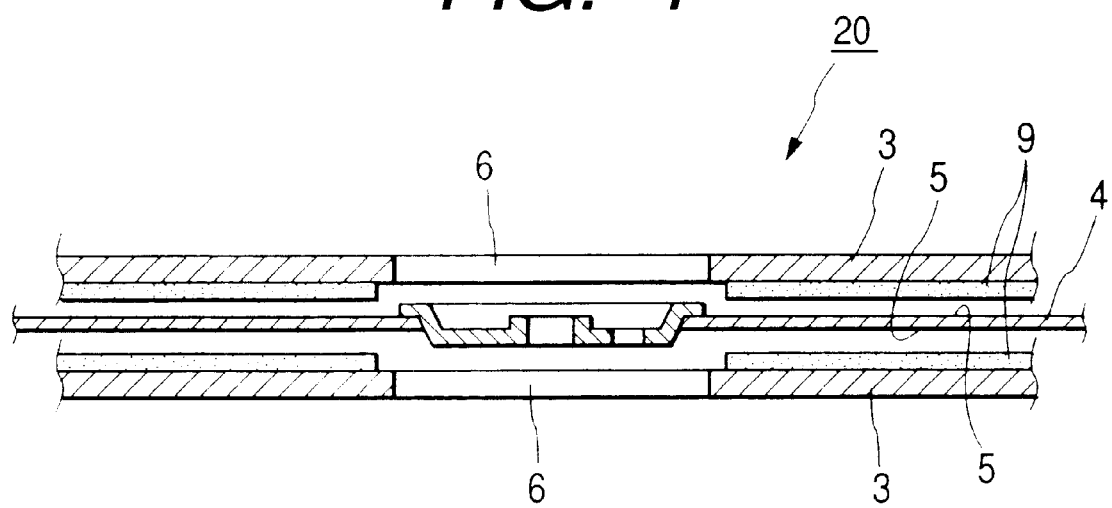
FIG. 1 is a partial section view showing an embodiment of the magnetic disk of the invention.

Hereinafter, embodiments of the invention will be described with reference to FIGS. 1 to 4. The same components as those of the prior art are denoted by the same reference numerals.

FIG. 1 is a section view of a magnetic disk (removable magnetic disk). As shown in the figure, in the magnetic disk 20, the disk case 2 is configured by the pair of upper and lower shells 3 which are overlappingly bonded to each other, and the disk-like magnetic data recording medium 4 is rotatably incorporated in the disk case 2. In the pair of shells 3, the windows 6 for allowing the reading/writing head to be contacted with the magnetic data recording plane 5 of the magnetic data recording medium 4 are formed.

On the other hand, the floppy disk drive (not shown) comprises: the reading/writing head which is to be contacted with the magnetic data recording plane 5 of the magnetic data recording medium 4 as described above; and a spindle motor (not shown) which rotates while engaging with a center portion of the magnetic data recording medium 4, thereby rotating the magnetic data recording medium 4. The floppy disk drive reads and writes data under a state where the reading/writing head is contacted with the magnetic data recording plane 5 through the windows 6 of the shells 3.

In the magnetic disk 20, liners 9 (electrostatic attracting means) are bonded to the faces of the shells 3 corresponding to the magnetic data recording plane 5, and the front and back sides of the magnetic data recording medium are supported by the liners 9, respectively.

In the embodiment, in order to prevent an error due to deposition of dust on the magnetic data recording plane 5 from occurring, the liners 9 are made of an electrostatic material such as a magnet (electret) which produces an electric field in the surroundings, preferably, a fibrous electrostatic material which has also an excellent function of surface charging. When such an electrostatic material is formed into an electrostatic charge attracting material having a shape of nonwoven fabric and the liners are configured by the electrostatic charge attracting material, an effect of attracting dust deposited on the magnetic data recording plane 5 is improved, so that prevention of a data read/write error is further enhanced. The liners 9 are configured so that, when the magnetic data recording medium 4 is rotated by the spindle motor, the liners wipe away dust deposited on the magnetic data recording plane 5 of the magnetic data recording medium 4, in positions upstream and downstream from the reading/writing head in the rotation direction, while supporting both sides of the magnetic data recording plane so as to prevent the medium from being directly contacted with the inner faces of the shells 3.

As described above, the magnetic disk 1 of the invention is configured so that dust which is to be deposited on the magnetic data recording plane 5 of the magnetic data recording medium 4 is attracted and held by means of an electrostatic force, whereby the recording plane is kept to be cleaner as compared with the prior art. According to this configuration, a read/write error due to deposition of dust can be prevented as far as possible from occurring. Therefore, the configuration can cope with an increased recording density of a magnetic data recording plane.

Figure 2:
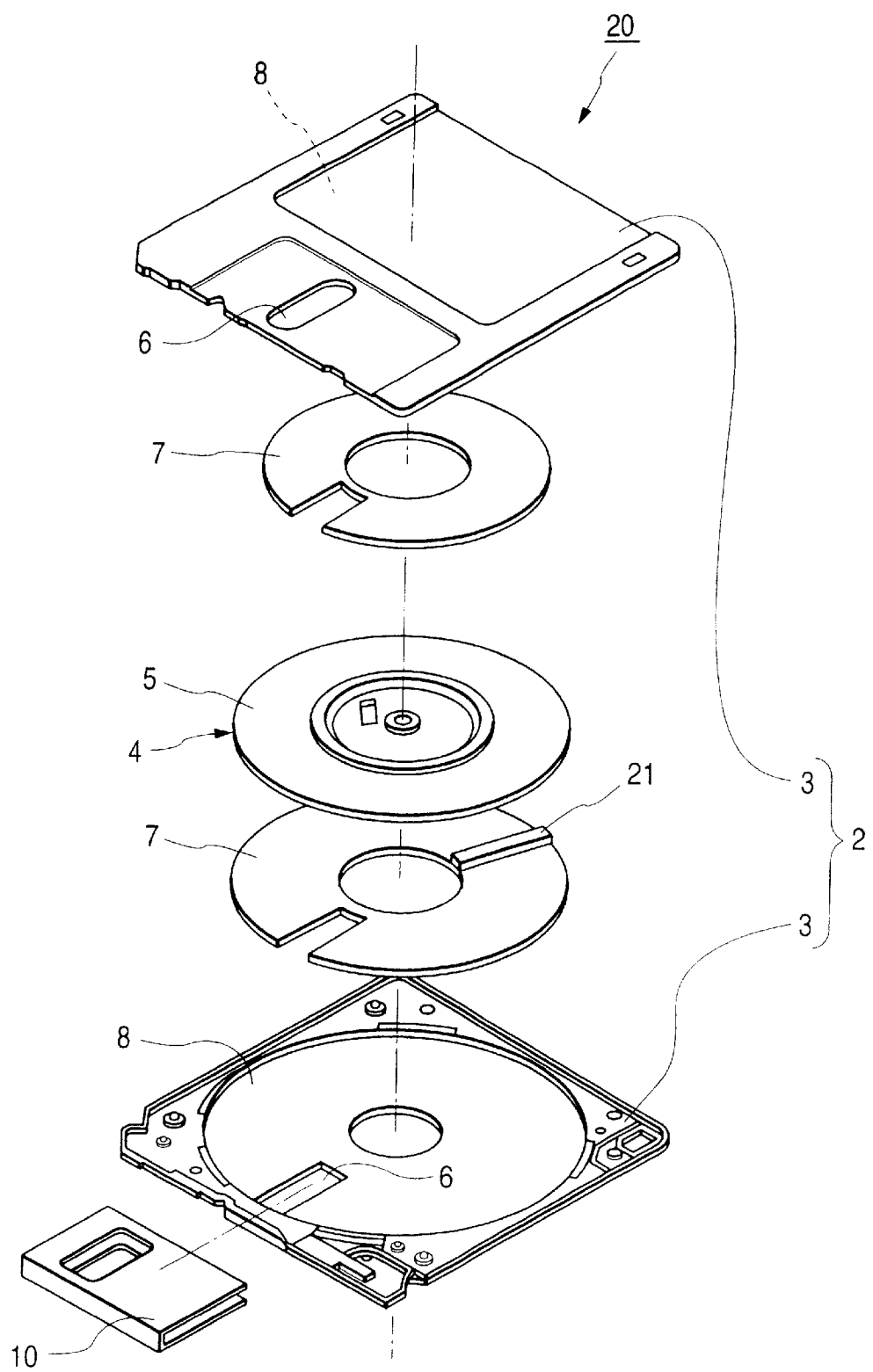
FIG. 2 is an exploded perspective view showing another embodiment of the magnetic disk of the invention.
Figure 5:
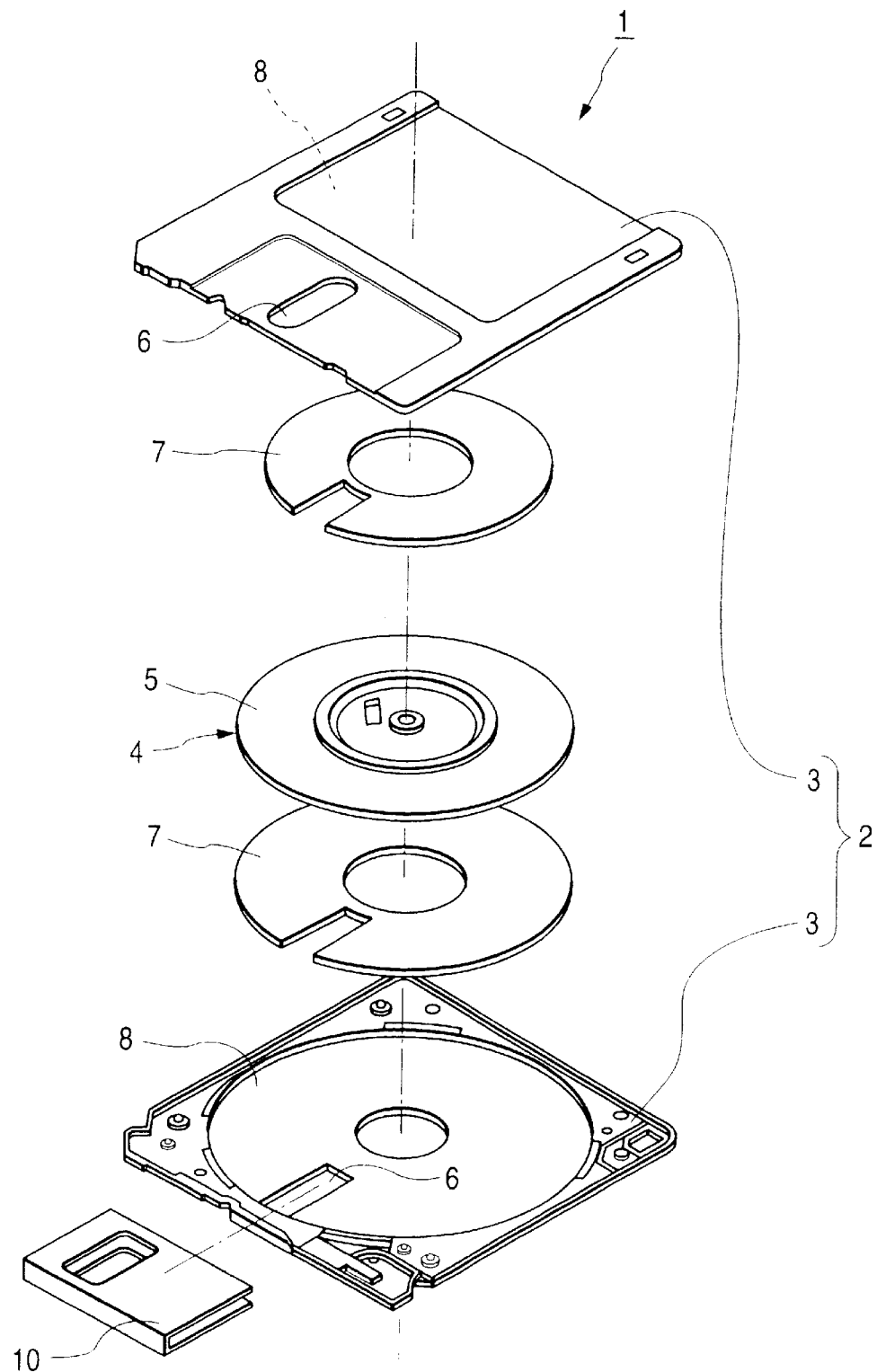
FIG. 5 is an exploded perspective view showing the structure of a magnetic disk of the conventional art.
Figure 6A:
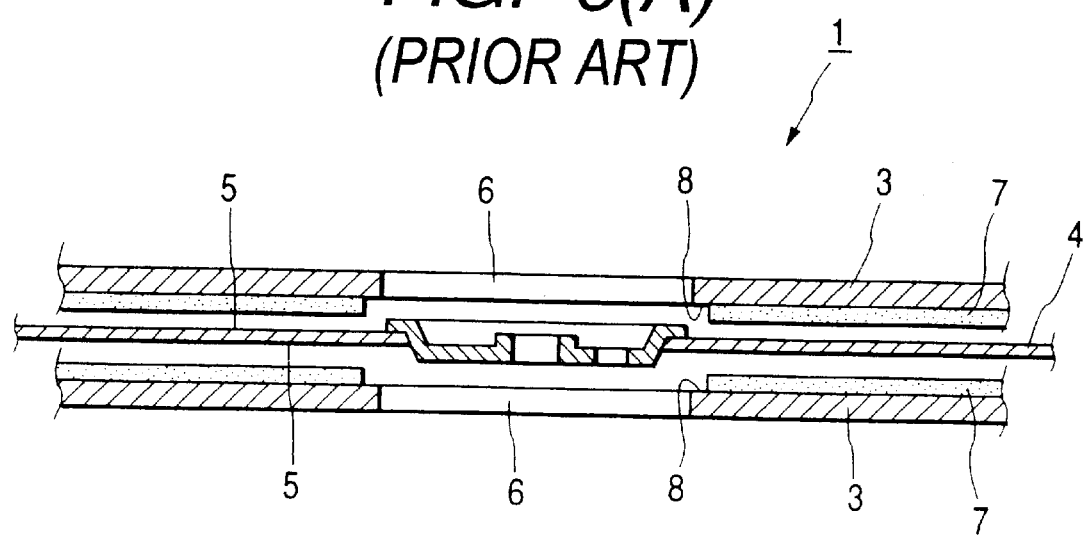
FIG. 6 is a partial section view showing the structure of the magnetic disk of the conventional art.
Figure 6B:
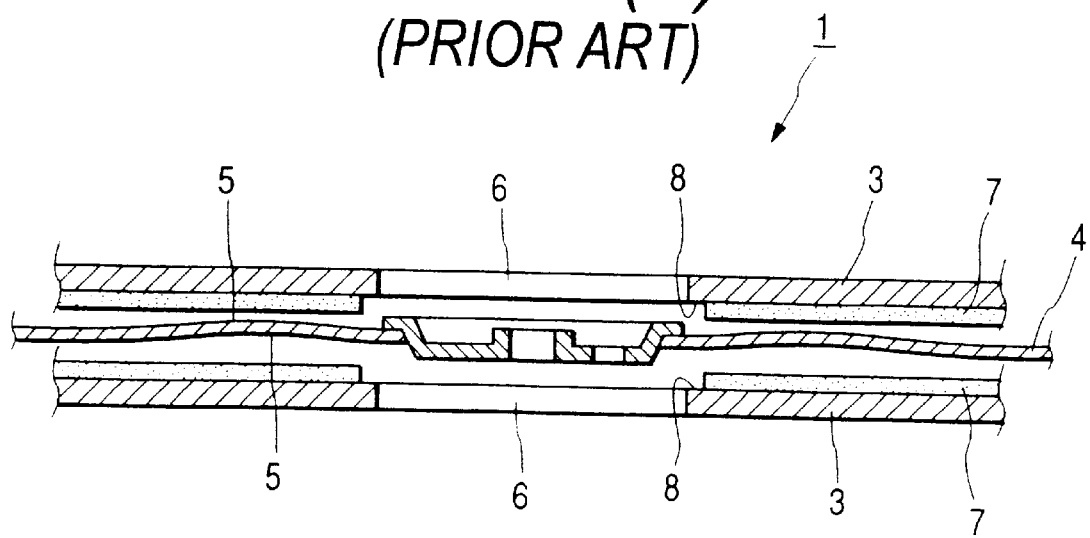

FIG. 2 shows an embodiment of a magnetic disk (removable magnetic disk) according to the invention of claim 2. In the embodiment, liners 7 which support the front and back sides of the magnetic data recording medium 4 so as to prevent the medium from being directly contacted with the inner faces 8 of the case 2 are configured in the same manner as the prior art and made of rayon or polyester, and a subliner 21 (electrostatic attracting means) made of the electrostatic material is bonded to each of the liners 7. In the embodiment, the attracting surfaces of the subliners 21 are set to be smaller in area than those of the liners 9 described above, and, by contrast, the electrostatic capacitances of the subliners are set to be equal to those of the liners 9. In other words, in the magnetic disk 20 of the embodiment, the electrostatic attractive force exerted by the subliners 21 is enhanced so as to reduce the amount of the material to be used, and the liners 7 of the prior art configuration are used, whereby the production cost can be largely reduced.

Figure 3:
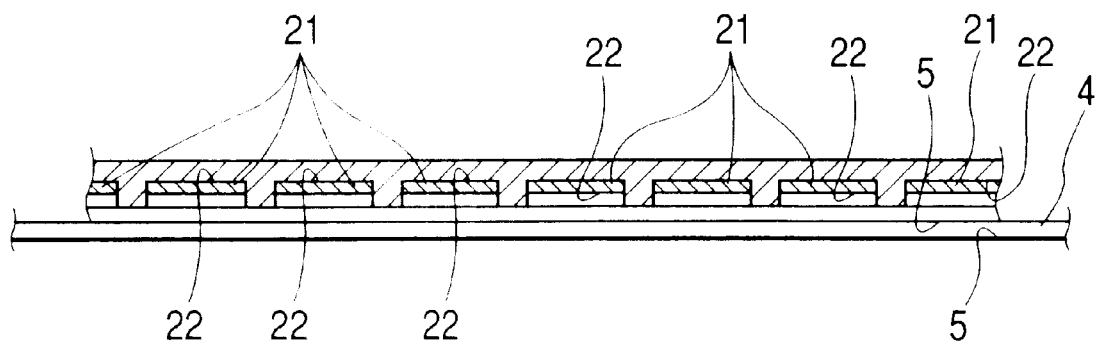
FIG. 3 is a partial section view showing a further embodiment of the magnetic disk of the invention.

As shown in FIG. 3, in each of the faces of the liners 7 which are respectively opposed to the magnetic data recording plane 5, at least one depression 22 which is opened toward the magnetic data recording plane 5 may be formed, and a subliner 21 exerting a predetermined electrostatic attractive force may be bonded to the depression 22. According to this configuration, the property of supporting the magnetic data recording medium 4 can be improved.

FIG. 4 shows another embodiment of a magnetic disk (removable magnetic disk), FIG. 4(A) shows a magnetic disk 23 to be used in a magnetic disk drive which is called a ZIP drive, and FIG. 4(B) shows a section taken along the line B—B of FIG. 4(A). As shown in FIGS. 4(A) and 4(B), in the same manner as the magnetic disk 1, in the magnetic disk 23, a disk case 24 is configured by bonding a pair of upper and lower shells (or jackets) 25 to each other, and a magnetic data recording medium 26 in which data can be read and written is rotatably incorporated in the disk case 24. A U-like portion is cut away from a center area of a front end of each of the shells 25 so as to form a window 27 for reading and writing operations. A shutter 28 is disposed on the upper and lower shells 25 so as to be slidable along the upper and lower faces and the front end faces. The window 27 can be opened and closed by sliding the shutter 28. When the magnetic disk 23 is inserted into a slot (not shown) of the magnetic disk drive, the shutter 28 is engaged with an opening and closing device (not shown) which is incorporated in the vicinity of the slot of the magnetic disk drive, to perform an opening operation. In the position where the shutter 28 is kept to a fully opened state by the opening and closing device, a reading/writing head 29 of the magnetic disk drive is relatively inserted between the magnetic data recording plane 30 of the magnetic data recording medium 26 and the inner face of one of the shells 25, through the window 27. The reading/writing head 29 is positioned at a predetermined height from the magnetic data recording plane 30 of the magnetic data recording medium 26, and, at the position, performs operations of reading and writing data on the magnetic data recording plane 30.

Disk-like liners 31 made of the electrostatic material are interposed between the inner faces of the shells 25 and the magnetic data recording plane 30 of the magnetic data recording medium 26, respectively. Dust in the magnetic disk case 24 is attracted to the liners 31 by means of an electrostatic attractive force exerted by the liners 31.

Also in the embodiment, therefore, deposition of dust on the magnetic data recording plane 30 is suppressed, so that a data read/write error which is mainly caused by dust is prevented from occurring.

When the electrostatic attractive force is sufficiently greater with respect to attraction of dust, the liners 31 may have a shape which elongates in a radial direction of the magnetic data recording medium 26 in the same manner as the subliners 21. In the magnetic disk 23 of such a non-contact type, it is preferable to respectively bond sheets 32 made of the electrostatic material to at least faces of the shutter 28 which are opposed to the magnetic data recording medium 26. In this case, the area surrounding the reading/writing head 29 can be kept clean, and hence a data read/write error can be prevented as far as possible from occurring particularly at a start of a reading/writing operation.

In the embodiments of the invention, a magnetic disk is used as a data recording disk. The invention may be applied also to an optical disk or an optical disk drive so as to maintain cleanness of a data recording plane.

In this way, the invention may be variously modified without departing from the spirit of the invention, and all modifications should be considered to within the scope of the invention.

According to the invention, as described in the embodiments, dust is attracted by means of an electrostatic force to maintain cleanness of a data recording plane of a magnetic data recording medium. Therefore, a read/write error can be prevented as far as possible from occurring. The invention attains further remarkable effects. Since a data recording plane of a magnetic data recording medium can be kept clean, for example, the density of the magnetic data recording medium can be increased.

What is claimed is:

1. A magnetic disk comprising:
   a magnetic data recording medium in which data are allowed to be read and written; and
   electrostatic attracting means for attracting dust by an electrostatic attractive force, said electrostatic attracting means being made of an electrostatic material and opposed to a magnetic data recording plane of said magnetic data recording medium, wherein said electrostatic attracting means comprises a magnet; and
   a disk case rotatably incorporating said magnetic data recording medium, wherein said electrostatic attracting means is formed of liners which are made of an electrostatic material, and which are interposed between inner faces of said case and the magnetic data recording plane of said magnetic data recording medium to support directly front and back side of said magnetic data recording medium, said liners attracting dust by an electrostatic attractive force.

2. The magnetic disk according to claim 1 wherein said magnetic data recording medium is substantially disk shaped.

3. A magnetic disk, comprising:
   a magnetic data recording medium in which data are allowed to be read and written;
   electrostatic attracting means for attracting dust by an electronic attractive force, said electrostatic attracting means being made of an electrostatic material and opposed to a magnetic data recording plane of said magnetic data recording medium;
   a disk case rotatably incorporating said magnetic data recording medium; and
   liners interposed between inner faces of said case and the magnetic data recording plane of said magnetic data recording medium to support front and back sides of said magnetic data recording medium,
   wherein said electrostatic attracting means is formed by subliners which are made of an electrostatic material, and which are interposed between said liners and the magnetic data recording plane of said magnetic data recording medium, said subliners attracting dust by an electrostatic attractive force,
   wherein said liners have depressions formed therein which have openings which are directed towards said magnetic data recording plane, and wherein said subliners are positioned within said depressions.

4. The magnetic disk according to claim 3, wherein said magnetic data recording medium is substantially disk-shaped.

5. A magnetic disk, comprising:
   a magnetic data recording medium in which data are allowed to be read and written;
   electrostatic attracting means for attracting dust by an electronic attractive force, said electrostatic attracting means being made of an electrostatic material and opposed to a magnetic data recording plane of said magnetic data recording medium;
   a disk case rotatably incorporating said magnetic recording medium; and
   liners interposed between inner faces of said case and the magnetic data recording plane of said magnetic data recording medium to support front and back sides of said magnetic data recording medium,
   wherein said electrostatic attracting means is formed by subliners which are made of an electrostatic material, and which are interposed between said liners and the magnetic data recording plane of said magnetic data recording medium,
   said subliners attracting dust by an electrostatic attractive force,
   wherein said electrostatic attracting means comprises a magnet.

* * * * *